Patented Mar. 11, 1947

2,417,208

UNITED STATES PATENT OFFICE 2,417,208

BASIC ESTERS OF MONOALKYL ISOBUTYL ACETIC ACIDS

Henry Martin and Alfred Margot, Basel, Switzerland, assignors to the firm J. R. Geigy A. G., Basel, Switzerland No Drawing. Application August 11, 1944, Serial No. 549,122. In Switzerland August 4, 1943

6 Claims. (Cl. 260—294)

According to experiments made by Fromherz and other authors (cf. Arch. exp. Path. u. Pharm. 173, 124 (1933)) basic esters of aliphatic carboxylic acids do not possess manifest antispasmodic properties. Moreover, aliphatic carboxylic acid esters which have become known in the patent literature, such as the isovaleric acid ester, α-bromoisovaleric acid ester, isopropylallyl acetic acid ester or diethyl acetic acid ester of 3 - diethylamino - 2:2 - dimethyl - 1 - propanol show also a very slight neurotropic-atropine-like behaviour. The esters mentioned by Halpern (cf. Arch. internat. de Pharmacodyn. 59, 149 (1938)), such as the ethylbutylacetic acid ester or dibutyl acetic acid ester of diethylaminoethanol, the di-butyl acetic acid ester of diethylamino-(1)-propanol-(3), the acetic acid ester, propionic acid ester, n-butyric acid ester, diethyl acetic acid ester, ethylbutylacetic acid ester or the dibutyl acetic acid ester of diethylamino-(1)-pentanol-(4) are not substantially more efficacious.

In contradistinction thereto it has surprisingly been found that basic esters of the monoalkyl isobutyl acetic acids possess excellent antispasmodic properties. Such a behaviour could, of course, neither be foreseen nor expected.

For the preparation of the esters for instance reactive derivatives of the monoalkyl isobutyl acetic acids, i. e. their halides, esters or anhydrides, are caused to react in the presence or absence of condensation agents with amino alcohols which are tertiarily substituted at the nitrogen atom; another method consists in causing reactive esters of the said amino alcohols to react, if necessary in the presence of acid binding agents, with the above cited acids or their salts respectively.

By the expression "reactive esters of amino alcohols" especially esters with hydrogen halide acids, with aryl sulfonic acids and the like may be understood.

Furthermore, it is also possible to convert monoalkyl isobutyl acetic acids into their halogen alkyl esters and to cause the latter to react with secondary amines. For the preparation of the halogen alkyl esters it is advantageous to cause alkylene halogen hydrines to react with monoalkyl isobutyl acetic acids or halides, esters or anhydrides respectively in the presence or absence of condensation agents or to allow alkylene halogen hydrines or alkylene dihalides to react with salts of the said acids and finally to replace the hydroxyl groups which may be present in the resulting compounds by halogen.

The basic esters claimed herein are soluble in water in form of their salts with inorganic or organic acids.

The present invention will be illustrated, but not limited by the following examples, the parts being by weight, unless otherwise stated.

Example 1

9 parts of n-propyl isobutyl acetic acid chloride or corresponding quantities of the bromide are added under stirring to 6 parts of diethylaminoethanol and the resulting mixture is heated, while further stirring, for a short time to 160° C., whereby under development of heat a bright brown oil is obtained which advantageously is treated with water while warm. The aqueous solution is extracted several times with ether and the base is then freed by means of concentrated ammonia. The base is extracted with ether and, after washing with water and drying the ethereal solution, the solvent is distilled off. The residue boils at 16 mm. pressure at 145°–147° C.

In an analogous manner the esters can also be produced with other basic alcohols, such as dimethylaminoethanol (B. P. 117°–120° C. at 12 mm. pressure), dimethylaminopropanol (B. P. 130°–132° C. at 11 mm. pressure), diethylaminopropanol (B. P. 148°–150° C. at 11 mm. pressure), piperidinoethanol (B. P. 155°–158° C. at 11 mm. pressure), piperidinopropanol and m-dimethyl- or methyl-ethyl-amino-cyclohexanol.

Furthermore, methyl-ethylaminoethanol or -propanol, ethyl-propylaminoethanol or -propanol as well as methylpropylaminoethanol or -propanol may also be used.

Example 2

19 parts of di-isobutyl acetic acid are heated to boiling for 24 hours under stirring with 14 parts of β-chloroethyl diethylamine and with 20 parts of potassium carbonate in 250 parts by volume of dry acetic acid ester. After cooling the potassium chloride is filtered by suction, the residue is washed with acetic acid ester and the combined filtrates are extracted by means of dilute hydrochloric acid. The acid solution thus obtained is extracted with ether, then the base is made free by addition of a potassium carbonate solution and extracted with ether. After having dried the ethereal solution the solvent is distilled off. The residue boils at a pressure of 0.8 mm. at 98°–99° C.

In the same manner for instance the n-butyl isobutyl acetic acid and n-amyl isobutyl acetic acid may also be converted into the corresponding basic esters.

Example 3

35 parts of di-isobutyl acetic acid chloride or the equivalent quantity of the bromide are caused to react with 17 parts of ethylene chlorohydrine in the presence of pyridine. After complete interaction the reaction mixture is extracted with ether and water, the ethereal solution is dried and the solvent distilled off. The residue is fractionated in vacuo and 20 parts of the so-obtained di-isobutyl acetic acid-$\beta$-chloroethyl ester are allowed to react in the heat with 14 parts of piperidine. The mixture is extracted with ether and water. After having dried the ethereal solution the solvent is distilled off. The residue boils at 0.5 mm. pressure at 115°–117° C. The same substance may be obtained by condensation of di-isobutyl acetic acid chloride with piperidinoethanol.

Example 4

9.5 parts of di-isobutyl acetic acid chloride are added, while stirring, to 5.2 parts of dimethyl amino propanol and this mixture is heated for a short time to 160° C. The reaction product is worked up in the same manner as described in Example 1, whereby the dimethylamino propanol ester of the di-isobutyl acetic acid is obtained which boils at a pressure of 12 mm. at 137°–139° C.

What we claim is:

1. A basic ester of a monoalkyl-isobutyl acetic acid of the formula $$\begin{array}{c} CH_3 \\ \phantom{X}\diagdown \\ \phantom{XX}CH-CH_2-C-COO.A-X \\ \phantom{X}\diagup \phantom{XXXXX} | \\ CH_3 \phantom{XXXX} \text{(lower alkyl)} \end{array}$$

wherein A represents a member of the group consisting of an unsubstituted alkylene chain containing from two to three carbon atoms and of a cyclohexane ring and X represents a member of the group consisting of the radicals $$-N=(\text{lower alkyl})_2 \quad \text{and} \quad -N\begin{array}{c}CH_2-CH_2\\ \diagdown \\ \phantom{XX}CH_2 \\ \diagup \\ CH_2-CH_2\end{array}$$

which compound is soluble in organic solvents and insoluble in water, forming with acids water-soluble salts of antispasmodic properties.

2. A basic ester of a di-isobutyl acetic acid of the formula $$\left(\begin{array}{c}CH_3\\ \diagdown \\ \phantom{XX}CH-CH_2\\ \diagup \\ CH_3\end{array}\right)_2 = CH-COO.A-X$$

wherein A represents a member of the group consisting of an unsubstituted alkylene chain containing from two to three carbon atoms and of a cyclohexane ring and X represents a member of the group consisting of the radicals $$-N=(\text{lower alkyl})_2 \quad \text{and} \quad -N\begin{array}{c}CH_2-CH_2\\ \diagdown \\ \phantom{XX}CH_2 \\ \diagup \\ CH_2-CH_2\end{array}$$

which compound is soluble in organic solvents and insoluble in water, forming with acids water-soluble salts of antispasmodic properties.

3. A basic ester of a monoalkyl-isobutyl acetic acid of the formula $$\begin{array}{c} CH_3 \phantom{XXXXXXXXXXXXX} \text{lower alkyl}\\ \diagdown \phantom{XXXXXXXXXXXXXXX} \diagup \\ CH-CH_2-CH-COO.A-N \\ \diagup \phantom{XXXXX} | \phantom{XXXXXXX} \diagdown \\ CH_3 \phantom{XX} \text{(lower alkyl)} \phantom{XX} \text{lower alkyl} \end{array}$$

wherein A represents a member of the group consisting of an unsubstituted alkylene chain containing from two to three carbon atoms and of a cyclohexane ring, which compound is soluble in organic solvents and insoluble in water, forming with acids water-soluble salts of antispasmodic properties.

4. The basic ester of di-isobutyl acetic acid of the formula $$\left(\begin{array}{c}CH_3\\ \diagdown \\ \phantom{XX}CH-CH_2\\ \diagup \\ CH_3\end{array}\right)_2 = CH.COOCH_2.CH_2.N\begin{array}{c}CH_2-CH_2\\ \diagdown \\ \phantom{XX}CH_2 \\ \diagup \\ CH_2-CH_2\end{array}$$

being soluble in organic solvents and insoluble in water, and boiling at 0.5 mm. pressure at 115°–117° C. and forming with acids water-soluble salts of antispasmodic properties.

5. The basic ester of di-isobutyl acetic acid of the formula $$\left(\begin{array}{c}CH_3\\ \diagdown \\ \phantom{XX}CH-CH_2\\ \diagup \\ CH_3\end{array}\right)_2 = CH.COOCH_2.CH_2-N\begin{array}{c}C_2H_5\\ \diagup \\ \diagdown \\ C_2H_5\end{array}$$

being soluble in organic solvents and insoluble in water, boiling at 0.8 mm. pressure at 98°–99° C. and forming with acids water-soluble salts of antispasmodic properties.

6. The basic ester of propyl-isobutyl acetic acid of the formula $$\begin{array}{c} CH_3.CH_2.CH_2 \phantom{XXXXXXXXXXX} C_2H_5\\ \diagdown \phantom{XXXXXXXXXXXXXXXX} \diagup \\ CH-COOCH_2.CH_2.CH_2.N \\ \diagup \phantom{XXXXXXXXXXXXXXXX} \diagdown \\ CH_3 \phantom{XXXXXXXXXXXXX} C_2H_5\\ \diagdown \\ CH-CH_2 \\ \diagup \\ CH_3 \end{array}$$

being soluble in organic solvents and insoluble in water boiling at 11 mm. pressure at 148°–150° C. and forming with acids water-soluble salts of antispasmodic properties.

HENRY MARTIN.
ALFRED MARGOT.

REFERENCES CITED

The following references are of record in the file of this patent:

UNITED STATES PATENTS

| Number | Name | Date |
|---|---|---|
| 2,223,244 | Bohm et al. | Nov. 26, 1940 |

OTHER REFERENCES

Freylon, Chemical Abstracts, vol. 4 (1910), pages 2297–8.

Journal of American Chemical Soc., vol. 55, 1933, pages 2059–61.